Sept. 5, 1939.     C. A. PALMGREN     2,172,070
CHUCK
Filed March 26, 1938
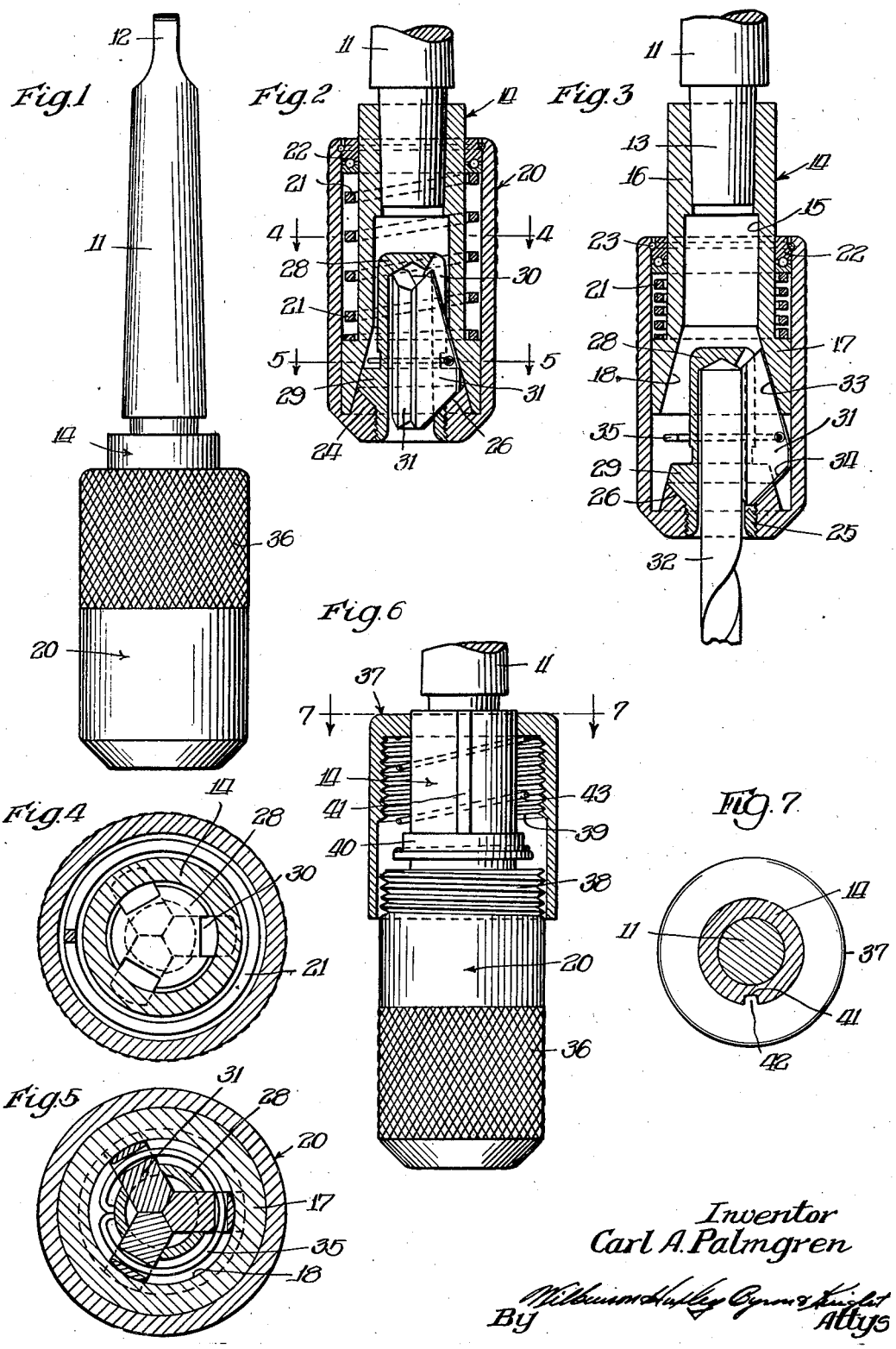
Inventor
Carl A. Palmgren Patented Sept. 5, 1939

2,172,070

UNITED STATES PATENT OFFICE 2,172,070

CHUCK

Carl A. Palmgren, Chicago, Ill.

Application March 26, 1938, Serial No. 198,212

3 Claims. (Cl. 279—65)

The invention relates to improvements in chucks for securely gripping and holding in operative position boring tools and the like such as drills, reamers and taps.

An object of the invention is to provide a chuck of novel construction which will permit release of the tool held thereby while the shank of the chuck continues its rotation and which release may be effected by the operator easily and without danger and with the minimum of time and effort.

Another object is to provide a chuck having means for releasing the tool held thereby which will not require stopping the machine that provides the power for rotating the chuck and wherein the tool released may be replaced by another tool with the same ease and facility and without danger to the operator.

Another object of the invention is to provide a chuck of the type described which will grip and hold the tool with an intensity that increases in direct proportion to the increase in pressure applied to the tool during the boring or other operations.

Another object resides in the provision of a chuck wherein the sleeve and retaining member for the gripping jaws comprise a unit and which is rotatably mounted on an adapter to which the power for rotating the chuck is applied. Also in the present chuck the sleeve has axial movement on the adapter which in one direction produces a clamping action on the gripping jaws and in the other direction permits release of the jaws. Therefore another object of the invention is to provide a chuck wherein the operation of inserting a tool without stopping the driving instrumentality of the clutch is rendered absolutely safe since when the sleeve is held against rotation preparatory to moving the sleeve axially to cause release of the gripping jaws the said gripping jaws are likewise stationary and they remain so until the sleeve is again allowed to rotate.

Another object is to provide a chuck of the character described which will be simple in construction comprising relatively few parts and which will fulfill all requirements of service.

With these and other objects in view the invention may consist of certain novel features of construction and operation, as will be more fully described and particularly pointed out in the specification, drawing and claims appended hereto.

In the drawing which illustrates an embodiment of the invention and wherein like reference characters are used to designate like parts—

Figure 1 is a view in elevation of the present chuck with the shank attached thereto;

Figure 2 is a vertical sectional view showing the internal construction of the chuck;

Figure 3 is a vertical sectional view similar to Figure 2 but showing a drill engaged by the gripping jaws;

Figure 4 is a transverse sectional view taken substantially along line 4—4 of Figure 2;

Figure 5 is a horizontal sectional view taken substantially along line 5—5 of Figure 2;

Figure 6 is an elevational view, parts being shown in section of a modified form of chuck; and Figure 7 is a horizontal sectional view taken substantially along line 7—7 of Figure 6.

Referring to the drawing, particularly Figure 1, the chuck of the invention is shown in association with the tapering shank 11 provided at its upper end with the tongue 12. The shank is adapted to be inserted within a holder forming part of the drill press or other machine (not shown) and which supplies the power for rotating the chuck, the same being transmitted thereto through the shank 11. As better shown in Figures 2 and 3 said shank has a reduced end portion 13 which is likewise tapered although the taper in this instance is just the reverse of that of the main body portion of the shank. Through the portion 13 the shank is non-rotatably secured to an adapter 14 of generally elongated shape having a bore 15 extending therethrough. The upper portion 16 of the adapter is secured to the shank as above described. The lower or head end 17 of the adapter is somewhat enlarged in diameter with respect to the cylindrical portion thereof and is provided with internal tapering surfaces 18 which provide a flaring entrance for the central bore 15 of the adapter.

The sleeve 20 of the chuck provides a housing for the head end 17 of the adapter, the sleeve entirely enclosing this portion of the adapter which has an over-all diameter conforming to the interior of the sleeve, whereby the sleeve has a sliding fit with respect thereto, which likewise permits rotation of the adapter while the sleeve remains stationary. The part 17 of the adapter provides a shoulder against which the coil spring 21 is adapted to seat. Said coil spring encircles the cylindrical portion of the adapter and is confined within the sleeve by the roller bearing assembly 22, the same being releasably retained within the sleeve by the retaining ring 23. Said ring may be removed by using a small tool such as a screw driver. However, it is first necessary to depress the ball bearing assembly to position the top surface of the upper race member below the said ring so as to allow access thereto. With the ring released the ball bearing assembly 22, which has a sliding fit on the adapter, may be removed, permitting removal of the coil spring 21 and removal also of the adapter from the sleeve 20.

The nose portion 24 of the sleeve is provided with threads 25 and with upwardly directed tapering surfaces 26 located above the threads. By means of the threads a retaining member 28 is fixedly secured to the sleeve 20, the same extending axially within said sleeve and for a distance approximately one-half the length thereof. Portion 29 of said member provides a stop therefor, the same having surfaces adapted to contact the tapering surfaces 26. The retaining member is also provided with three slots such as 30, said slots extending lengthwise of said member and being spaced 120 degrees from each other, as best shown in Figures 4 and 5. Said slots receive the gripping jaws 31. The jaws may be described as generally triangular in shape, the edge of each jaw forming the hypotenuse or long side of the triangle, being pointed, as best shown in Figure 5. This pointed edge of each jaw is directed inwardly so that the same is adapted to engage and clamp the tool 32 inserted within the retaining member 28 for the purpose. The two remaining edges of each jaw, which form the other sides of the triangle, slope in opposite directions and as a result of these opposed sloping sides each gripping jaw is positively forced in a direction inwardly so that the tool is securely gripped and held by the sleeve 20. The tapering edge 33 of each jaw conforms to the tapering surfaces 18 of the adapter, whereas, the slope or taper of the edge 34 conforms to that of the surfaces 26 with which the said edge engages. Each gripping jaw is provided with an opening approximately centrally thereof through which is inserted the expanding member 35 in the form of a ring of resilient wire which will cause outward movement of said gripping jaws to thereby allow insertion of a tool such as a drill 32.

An important feature of the present chuck resides in the rotatable mounting of the sleeve 20 on the adapter 14. The portion 17 of the adapter has a sliding and rotating fit within the sleeve 20 and since the sleeve at its upper end is carried by the adapter through the ball bearing assembly 22 very little resistance is offered when the sleeve is gripped and held against rotation by the operator. It will be observed that the coil spring 21 is confined between the shoulder 17 of the adapter and the ball bearing assembly. Accordingly, the sleeve 20 is forced upwardly with respect to the adapter, locating the portion 17 in the extreme lower end of the sleeve. The action of the tapering surfaces 18 on the edges 33 of the jaws forces said jaws inwardly so that the entrance to the retaining member is entirely closed thereby. This position of the jaws is shown in Figure 5. In order to insert a tool such as a drill 32 within the retaining member it is necessary for the operator to grip the sleeve 20, holding the same against rotation, and to move the same downwardly with respect to the adapter, which movement of the sleeve results in compressing the spring 21. However, this movement in effect withdraws the portion 17 of the adapter from the lower end of the sleeve, whereby the jaws expand, outward travel of the jaws being automatically effected by the member 35. In other words, it will be understood that as a result of the expansion member 35 the jaws will automatically move outwardly when permitted to do so. This outward position of the jaws makes it possible for the operator to readily insert the shank of the tool within the retaining member 28. Following insertion of the tool the operator allows the sleeve to move upwardly on the adapter. This movement is the result of the coil spring 21 which automatically forces the jaws inwardly into clamping engagement with the tool. The sleeve 20 can now be released and rotation of the chuck and tool will thereupon take place.

By the operations above described a tool such as a drill can be inserted within the present chuck notwithstanding that the shank 11 has continued to rotate during the entire procedure. Therefore, as a result of the novel internal construction of the present chuck it is not necessary to stop the machine in order to release the tool from the chuck and further, the operation can be effected easily with the minimum of time and effort and without danger to the operator. The knurled portion 36 on the sleeve provides a gripping surface for the operator and it will be observed that when the sleeve is stationary the clamping jaws 31 are likewise stationary, since these jaws are carried by the slots 30 formed in the retaining member, which member and sleeve comprises a unit. There is absolutely no danger in the act of inserting the drill since not only are the jaws stationary but said jaws automatically move in an outward direction for receiving the tool when permitted to do so.

In the present chuck the rotations of the shank 11 are applied to the clamping jaws 31 and through said jaws to the drill or similar tool. Notwithstanding this construction and the fact that it is possible to readily stop the rotation of the sleeve and likewise the tool the latter is securely gripped and held during the boring or like operation. Thus the present chuck permits easy removal of the tool and also insures rotation of the tool during the boring operation when such rotation is absolutely essential. In fact, the structure of the invention is such that the tool is gripped and held with an intensity that increases in direct proportion to the increase in pressure applied to the tool during the boring or other operation. The pressure on the tool is transmitted to the retaining member 28 and accordingly said member and sleeve tend to move upwardly with respect to the adapter. This forces the tapering surfaces 18 into contact with the edge 33 of each jaw, thereby forcing the jaw into clamping engagement with the tool. This application of upward pressure to the retaining member and sleeve likewise forces the tapering surfaces 26 into contact with the edge 34 of the jaws. This action also has the effect of forcing the jaws inwardly into clamping engagement with the tool.

In the modification of Figure 6, a cap member 37 is provided for locking the sleeve 20 to the adapter 14, thereby preventing relative rotation of the parts. In order that the cap member may be releasably connected to the sleeve the latter is provided with threads 38 and the interior of the cap member is threaded as at 39. The adapter 14 in this modification extends some distance above the sleeve, which extending portion is formed with a collar 40 and above said collar the adapter is provided with a longitudinal groove 41. The said groove receives the projection 42 of the cap member whereby the cap member and adapter are non-rotatably associated although the member may move in a direction axially of the adapter. A spring 43 is located within the member and has encircling relation with the adapter, being confined between the collar 40 and the upper wall of the cap member.

In assembling the member 37 and sleeve 20 the shank 11 is passed through the opening in the member which is then moved downwardly on the shank and eventually associated with the adapter 14, the projection 42 of the member fitting in the groove 41 of the adapter, Figure 7. The member is now moved against the tension of spring 43 until the threads 38 and 39 engage, whereupon rotation of the sleeve 20 will threadedly secure the said parts together. Therefore, in this modification rotation of the adapter independently of the sleeve is not possible.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. In a chuck, an adapter of substantially cylindrical form having connection with a shank at one end and having tapering interior surfaces formed in its other end, a sleeve carrying a plurality of gripping jaws yieldingly biased into released position, means mounting said sleeve on the adapter for rotation and for limited axial movement thereof and which locates said gripping jaws in co-acting relation with said tapering surfaces, said surfaces tapering in a direction to form an interior opening in the adapter of gradually smaller size, and said gripping jaws also having tapering surfaces which contact therewith, whereby axial movement of the sleeve in one direction applies a clamping action to the jaws causing them to move inwardly and whereby axial movement of the sleeve in an opposite direction allows said jaws to expand into released position, and a coil spring located between the adapter and said sleeve yieldingly biasing the sleeve in a direction to apply a clamping action to said jaws.

2. In a chuck, an adapter of substantially cylindrical form having connection with a shank at one end and having tapering interior surfaces formed in its other end, a sleeve rotatably mounted on said adapter and also having limited movement axially thereof, a plurality of gripping jaws carried by said sleeve, said jaws having oppositely tapering surfaces on their exterior certain of which have co-acting relation with the tapering surfaces formed on said adapter, said other surfaces on the gripping jaws having contact with said sleeve, said adapter and sleeve both acting on said jaws to produce inward clamping movement thereof as a result of axial movement of the sleeve in one direction, means yieldingly connecting the jaws tending to expand the same into released position upon axial movement of the sleeve in an opposite direction, and resilient means located between the adapter and said sleeve for yieldingly biasing the sleeve in a direction to force the jaws into clamping position.

3. In a chuck, an adapter having an exterior shoulder intermediate its length and having interiorly tapering surfaces at its lower end, a sleeve mounted on said adapter in a manner permitting limited axial movement thereof, a coil spring between the adapter and sleeve and engaging the shoulder at one end, a ball bearing race retained by the sleeve and engaging the spring at its other end whereby said sleeve is also freely rotatable on said adapter, a plurality of gripping jaws carried by said sleeve and located thereby in co-acting relation with the tapering surfaces of the adapter, said sleeve under the tension exerted by said coil spring forcing the jaws into contact with said tapering surfaces to produce inward clamping movement of the jaws, and means yieldingly biasing the jaws into released position when said sleeve is axially moved in a direction against the tension of said coil spring.

CARL A. PALMGREN.